Jan. 3, 1928.
M. KRAUS
1,654,739
SANDING DEVICE FOR AUTOMOBILES
Filed May 7, 1927    2 Sheets-Sheet 1
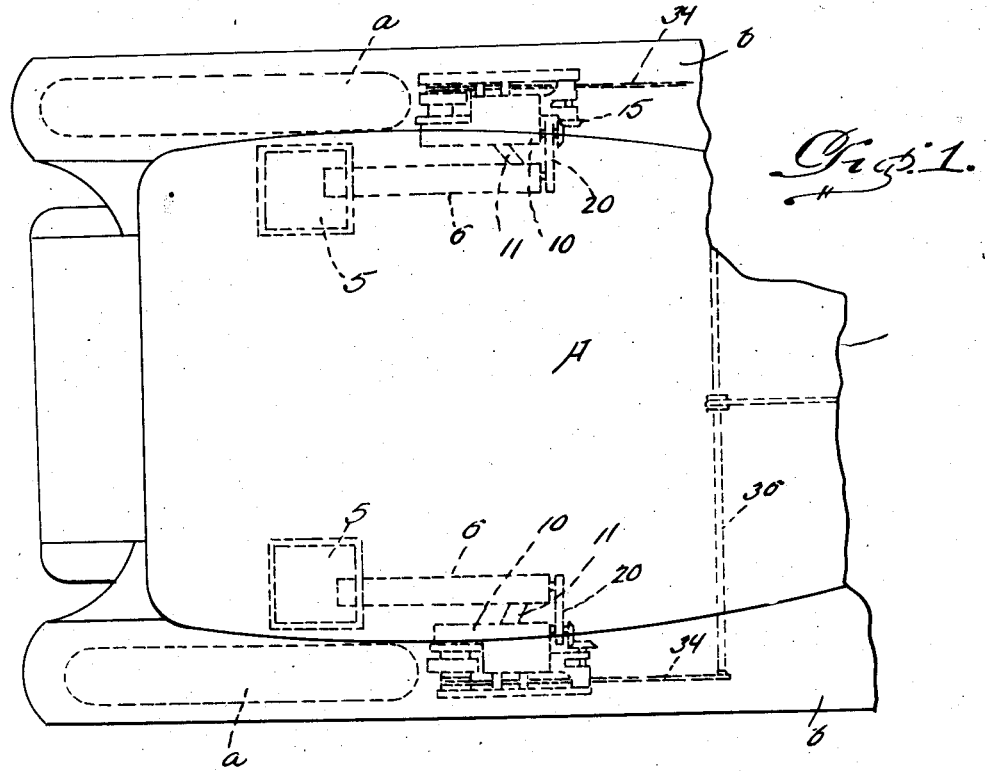
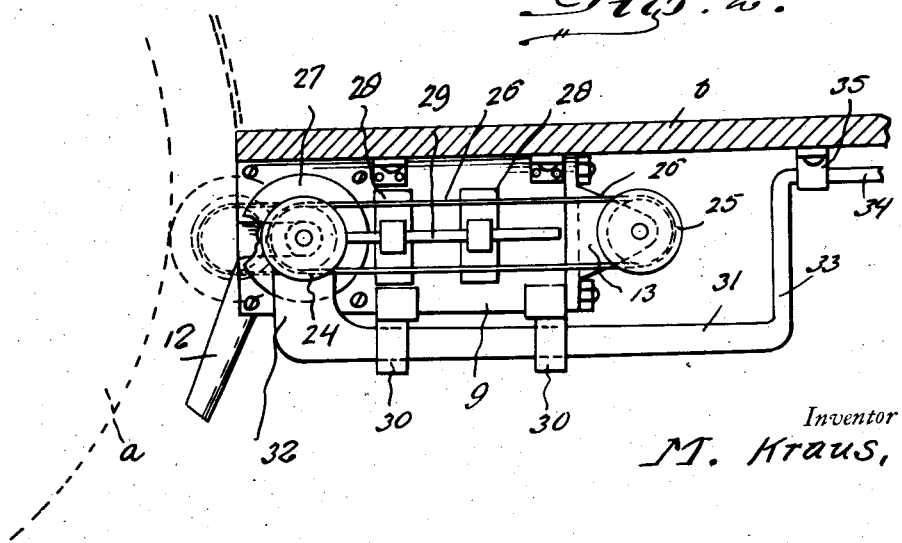
Inventor
M. Kraus,
By Clarence A. O'Brien
Attorney

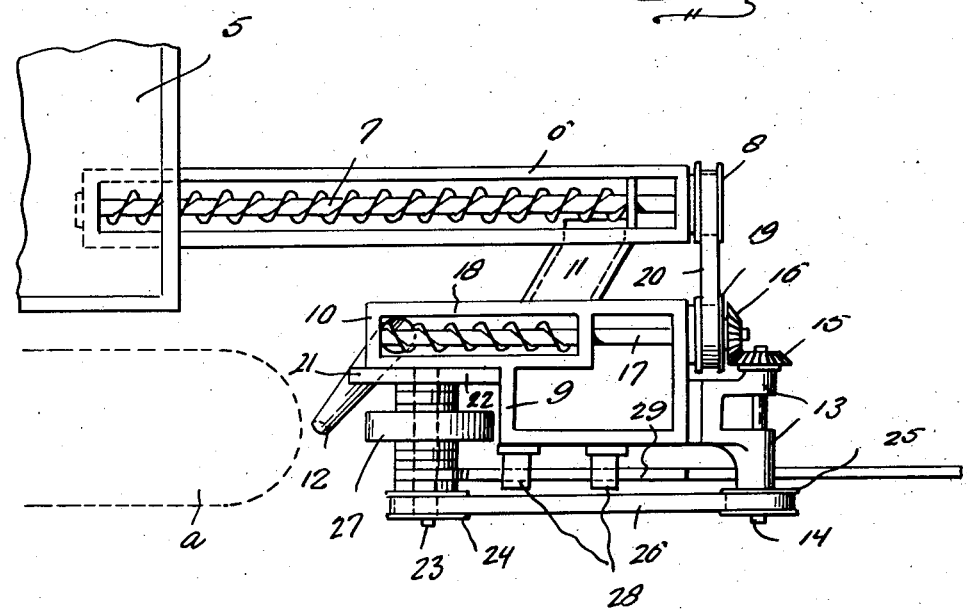
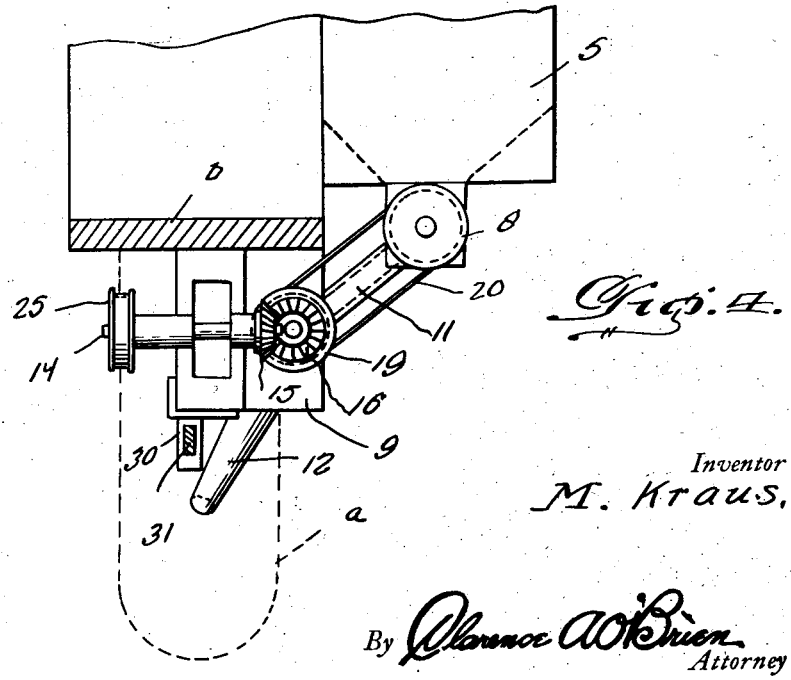

Patented Jan. 3, 1928.

1,654,739

UNITED STATES PATENT OFFICE.

MIKE KRAUS, OF YOUNGSTOWN, OHIO.

SANDING DEVICE FOR AUTOMOBILES.

Application filed May 7, 1927. Serial No. 189,621.

This invention relates to new and useful improvements in sanding devices, primarily adapted for association with automobiles whereby a supply of sand may be delivered in front of the driving wheels of the vehicle to prevent the slipping of the same on wet or icy roads.

In carrying out my invention there is provided highly novel, simple and efficiently operating means whereby the sand from the hoppers may be rapidly delivered to a point of discharge in front of the driving wheels whenever the same becomes necessary, and this without requiring any power unit, the delivery mechanism being operated by the rotation of the vehicle driving wheels.

In further carrying out my invention easily operated means is provided for engagement with the driving wheels of the vehicle to cause the operation of the sanding mechanism which means is normally out of engagement with the wheels, any desirable form of foot or hand lever being provided adjacent the operator of the vehicle to control the movement of the means into engagement with said wheels.

One of the most important objects of the invention is to provide a mechanism of this character that may be readily associated with motor vehicles now in use without to any unusual extent altering the construction thereof and without entailing considerable expenditure.

In the drawings wherein like reference characters indicate corresponding parts throughout the several views:

Figure 1 is a fragmentary top plan view of the rear end of an automobile equipped with my improved sanding mechanism, the same being disclosed in dotted lines.

Figure 2 is a longitudinal section through one of the vehicle running boards adjacent the rear wheel disclosing certain features of the present invention in side elevation.

Figure 3 is a top plan view of one of the units of the mechanism, and

Figure 4 is a front elevation thereof.

Now having particular reference to the drawings, A designates fragmentarily an automobile of the pleasure type including the usual rear driving wheels a—a, a—a extending forwardly from which are the usual running boards b—b. In carrying out my invention there is provided a sanding unit complementary to each of the driving wheels a—a, and insomuch as each unit is of identical construction, a description of one will suffice for both. Suspended from the floor board of the automobile in any suitable manner at the inner side of each driving wheel a—a is a sand hopper 5, while extending forwardly therefrom and having communication therewith at its rear end is a horizontal narrow elongated sand trough 6 within which is longitudinally disposed a spiral conveyor shaft 7, the forward end of which projects through the trough and is equipped with a belt pulley 8. Each unit further consists of a casting 9 suspended in any suitable manner beneath the adjacent running board B in front of the respective driving wheels a. As clearly indicated in Figure 3 each casting includes a short sand trough 10 in spaced parallel relation with the elongated trough 6 and at a point therebeneath as clearly indicated in Figure 4. The trough 6 has communication at its forward end with the forward end of the trough 10 by an inclined conveyor pipe 11, while the extreme rear end of the trough 10 is provided with a depending and outwardly extending sand discharge nozzle 12, the lower end of which terminates directly in front of and at the center of the wheels a.

Said casting 9 is of widened box-like formation at its forward end and equipped at said forward end with a transversely extending bearing 13 through which is journaled a shaft 14 the inner end of which is equipped with a beveled gear 15 having mesh with a bevel gear 16 upon the forward end of a shaft 17 that is extended through the center of the trough 10 and that is formed within the trough within a spiral conveyor rib 18. Furthermore, the forward end of said shaft 17 in back of the gear 16 is equipped with a belt pulley 19 in transverse alinement with the pulley 8 upon the forward end of the conveyor shaft 7 of the elongated sand trough 6. Trained over these pulleys 8 and 19 is an endless driving belt 20.

Attached to the outer face of the trough 10 is a horizontal plate 21 formed throughout its length with a slot 22 within which is slidable the inner end of a shaft 23. The outer end of this shaft 23 is equipped with a belt pulley 24, while the adjacent end of the transverse shaft 14 is also equipped with a belt pulley 25. Trained around these pulleys 24 and 25 is an endless elastic belt 26. Furthermore the shaft 23 is equipped at its center with a friction drive wheel 27 for engagement with the adjacent driving wheels *a* of the automobile when the shaft 23 is forced rearwardly with the result that the shaft 14 is driven for imparting motion to the conveyor shafts 7 and 17 with the obvious result that the sand is delivered from the hopper 5 into the trough 6 from the trough 6 through the inclined pipe 11 into the trough 10 from whence it discharges to the nozzle 12 into the path of the automobile wheels *a*.

The outer face of the enlarged end of the casting 9 is equipped with a pair of longitudinally spaced pin guide brackets 28—28 through which is longitudinally slidable a horizontal pin 29, the rear end of the same being of flattened circular formation and through the center of which loosely extends the shaft 23, this structure being provided for supporting the outer end of the shaft and to facilitate the proper longitudinal movement of the same toward or away from the vehicle wheels *a*.

Depending from the lower edge of the outer wall of the box-like end of said casing 9 is a pair of guide brackets 30—30 through which are longitudinally slidable an arm 31, the rear end of the arm projecting upwardly as at 32 and being loosely attached at said end to the shaft 23. The forward end of this arm 31 also projects upwardly as at 33 from which it extends forwardly as at 34, this forwardly extending portion being guided through a bracket 35. The ends of the forwardly extending portions 34 of the arms 31—31 of the units on opposite sides of the machine are joined by transversely extending equalizing bar 36 suitably supported beneath the floor board of the automobile, and which bar may be and preferably is operatively associated with a hand or foot lever adjacent the operator of the automobile, so that said bar may be rotated for causing the rearward movement of the arms 31—31 and the consequent engagement of the friction wheels 27 of the units with the traction wheels *a*—*a* of the vehicle with the result previously described.

It will thus be seen that I have provided a highly novel, simple and efficiently operating sanding device for automobiles that is well adapted for all the purposes heretofore designated, even though I have herein shown and described the invention as consisting of certain detail structural elements it is nevertheless to be understood that certain changes may be made therein without affecting the spirit and scope of the appended claims, especially is this true with respect to the sand hoppers and troughs which may be of any convenient or practical design. Furthermore, I do not desire to be limited to any particular positioning of the hoppers or troughs as the same may be disposed above or beneath the body floor boards and running boards.

Having thus described the invention, what I claim is:—

1. In a sanding device for automobiles, a sand hopper associated with the automobile adjacent one of the rear wheels thereof, a horizontal trough communicating at one end with the said hopper, a second trough in spaced parallel relation with the first mentioned trough, communicating means between the two troughs, means within the first mentioned trough for conducting the sand from the hopper into the trough and into the second trough through said communicating means, means within the second trough for causing the rearward movement of the sand, a discharge nozzle upon the rear end of the second mentioned trough terminating in position in front of said automobile wheel, and means engageable with said automobile wheel for causing the operation of said sand conducting means within said trough.

2. In a sanding device for automobiles, a sand hopper associated with the automobile adjacent one of the rear wheels, a horizontal sand trough extending forwardly from said hopper at the inner side of said wheel, a second trough arranged in spaced parallel relation with said first mentioned trough and closer to said wheel, a discharge nozzle arranged at the rear end of said second mentioned trough and terminating at a point forwardly of said wheel, normally inoperative means for causing the forward movement of the sand within the first mentioned trough and the rearward movement of the sand in the second mentioned trough, communicating means between the forward ends of both troughs, and means for engagement with the vehicle wheel whereby said means may be operated to deliver the sand to said nozzle.

3. In a sanding device for automobiles, a sand hopper associated with the automobile at the inner side of one of the traction wheels, a trough extending forwardly from and communicating at its rear end with said hopper, a longitudinal conveyor within said trough, a second trough arranged in spaced parallel relation with the first mentioned trough and forwardly of said wheel, a discharge at the rear end of said second mentioned trough, a conveyor within said second mentioned trough for causing the rearward movement of said sand, and single means for operating said conveyors to cause the conveying of the sand from the trough to the discharge of said second mentioned trough.

4. In a sanding device for automobiles, a sand hopper associated with the automobile at the inner side of one of the traction wheels, a trough extending forwardly from and communicating at its rear end with said hopper, a longitudinal conveyor within said trough, a second trough arranged in spaced parallel relation with the first mentioned trough and forwardly of said wheel, a discharge at the rear end of said second mentioned trough, a conveyor within said second mentioned trough for causing the rearward movement of said sand, single means for operating said conveyors to cause the conveying of the sand from the trough to the discharge of said second mentioned trough, said means consisting of rotating member mounted for forced engagement with said traction wheel and operatively connected to said conveyors.

In testimony whereof I affix my signature.

MIKE KRAUS.